(12) United States Patent
Ziminsky et al.

(10) Patent No.: US 7,681,401 B2
(45) Date of Patent: Mar. 23, 2010

(54) METHODS AND SYSTEMS FOR OPERATING A GAS TURBINE

(75) Inventors: Willy Steve Ziminsky, Simpsonville, SC (US); Arthur James Fossum, Greer, SC (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 11/467,016

(22) Filed: Aug. 24, 2006

(65) Prior Publication Data

US 2008/0047275 A1 Feb. 28, 2008

(51) Int. Cl.
*F02C 9/00* (2006.01)
(52) U.S. Cl. ..................... 60/773; 60/39.281
(58) Field of Classification Search ............ 60/773, 60/39.3, 39.53, 39.281; 290/40 B, 40 E
See application file for complete search history.

(56) References Cited

U.S. PATENT DOCUMENTS

| | | | | |
|---|---|---|---|---|
| 4,529,887 | A * | 7/1985 | Johnson | 290/40 R |
| 5,272,637 | A * | 12/1993 | Urushidani et al. | 701/100 |
| 5,520,512 | A | 5/1996 | Walker et al. | |
| 5,694,026 | A | 12/1997 | Blanchet | |
| 5,761,895 | A * | 6/1998 | Chu et al. | 60/773 |
| 6,118,187 | A | 9/2000 | Hepner et al. | |
| 6,226,974 | B1 * | 5/2001 | Andrew et al. | 60/772 |
| 6,519,944 | B2 | 2/2003 | Smith | |
| 6,670,721 | B2 | 12/2003 | Lof et al. | |
| 6,715,295 | B2 * | 4/2004 | Gadde et al. | 60/775 |
| 6,724,098 | B2 * | 4/2004 | Ortega et al. | 290/52 |
| 6,794,766 | B2 | 9/2004 | Wickert et al. | |
| 6,865,890 | B2 * | 3/2005 | Walker | 60/773 |
| 7,045,913 | B2 | 5/2006 | Ebrahim et al. | |
| 7,078,825 | B2 | 7/2006 | Ebrahim et al. | |
| 7,274,111 | B2 * | 9/2007 | Andrew et al. | 290/52 |
| 2005/0097895 | A1 * | 5/2005 | Kothnur et al. | 60/776 |
| 2005/0114010 | A1 * | 5/2005 | Healy et al. | 701/100 |
| 2005/0204745 | A1 * | 9/2005 | Hirayama et al. | 60/773 |
| 2007/0022734 | A1 * | 2/2007 | Utamura | 60/39.53 |
| 2007/0051109 | A1 * | 3/2007 | Sonoda et al. | 60/773 |

* cited by examiner

*Primary Examiner*—William H Rodríguez
*Assistant Examiner*—Phutthiwat Wongwian
(74) *Attorney, Agent, or Firm*—Armstrong Teasdale LLP

(57) ABSTRACT

A method of operating a gas turbine is provided, wherein the gas turbine engine is coupled to an electrical grid operating at a standardized grid frequency value, and the gas turbine includes a combustor coupled in flow communication with a plurality of independent fuel circuits and a compressor. The method includes determining a deviation of a grid frequency from the standardized grid frequency value and adjusting fuel flow from a portion of the plurality of fuel circuits while maintaining a substantially constant air flow from the compressor to facilitate controlling a fuel to compressor discharge pressure ratio such that a combustor state does not lag changes in airflow when the combustor responds to the grid frequency deviation.

20 Claims, 3 Drawing Sheets

METHODS AND SYSTEMS FOR OPERATING A GAS TURBINE

BACKGROUND OF THE INVENTION

This invention relates generally to gas turbines and, more particularly, to methods and systems for operating a gas turbine.

At least some known gas turbines are coupled to and supply power to an electric power grid to facilitate maintaining a desired grid frequency for grid operation. Grid instabilities may cause the grid frequency to change, which may cause, the gas turbine to either increase or decrease power production to maintain the desired grid frequency. For example, an increase in grid frequency may result in an under-frequency event wherein the gas turbine produces less power than is desired by the grid. As a result, in such an event, fuel flow to the gas turbine must be increased to enable the turbine to meet the increased power requirements of the grid. Alternatively, a decrease in grid frequency may result in an over-frequency event wherein the gas turbine produces more power than is required by the grid. As such, in such an event, fuel flow to the gas turbine must be decreased to prevent instability within the gas turbine. Current grid code requirements necessitate rapid changes in fuel flow because failure to rapidly respond to an over-frequency or under-frequency event may cause power outages including brownouts and/or blackouts.

At least some known gas turbines operate such that an increase or decrease in fuel flow to a combustor is accompanied by a corresponding increase or decrease in air flow to the combustor. However, increasing or decreasing both the fuel flow and the air flow simultaneously may result in a combustion excursion, wherein the combustor becomes unstable. To prevent combustion excursion, fuel flow adjustments are initiated prior to airflow adjustments. Specifically, in at least some known gas turbine engines, measured compressor pressure ratio (CPR) and measured gas turbine exhaust temperature (TTXM) values are used to facilitate controlling fuel and air flow in response to grid demands. Specifically, fuel flow is sensed and controlled by a fuel valve position, and air flow is sensed and controlled by a compressor inlet guide vane position. Moreover, the CPR and TTXM are also used to define a state of the combustion system by controlling a fuel split to the combustor nozzles. The fuel split is sensed and controlled by a valve positioned in each of the combustor fuel legs. As such, a change in fuel flow demanded and/or air flow demanded will not result in a change to combustor fuel splits until the fuel flow/air flow changes produce a change in CPR or TTXM. As such, by design, the combustor state lags behind the state of the gas turbine engine.

Because of combustor state lags, large grid fluctuations, which generally cause rapid changes in fuel flow/air flow, may result in abnormal combustor operations. Specifically, during operations in which fuel flow is being decreased, the combustor may be susceptible to lean fuel blowout. Moreover, operating with lean fuel conditions may change dynamic pressure oscillations within the combustor, resulting in combustor instability. During operations in which fuel flow is being increased, combustor dynamic pressure oscillations may be generated which may cause combustor instability. Ultimately, combustor instability and/or a flame out may result in loss of power to the electric power grid.

BRIEF DESCRIPTION OF THE INVENTION

In one aspect, a method of operating a gas turbine is provided, wherein the gas turbine engine is coupled to an electrical grid operating at a standardized grid frequency value, and the gas turbine includes a combustor coupled in flow communication with a plurality of independent fuel circuits and a compressor. The method includes determining a deviation of a grid frequency from the standardized grid frequency value and adjusting fuel flow from a portion of the plurality of fuel circuits while maintaining a substantially constant air flow from the compressor to facilitate controlling a fuel to compressor discharge pressure ratio such that a combustor state does not lag changes in airflow when the combustor responds to the grid frequency deviation.

In another aspect, a gas turbine is provided, wherein the gas turbine is coupled to an electrical grid operating at a standardized grid frequency value. The gas turbine includes a compressor, a plurality of independent fuel circuits, and a combustor coupled in flow communication with the plurality of independent fuel circuits and the compressor. The gas turbine also includes a sensor to determine a deviation of a grid frequency from the standardized grid frequency value and a controller to adjust fuel flow in response to the grid frequency deviation, wherein fuel flow to a portion of the plurality of independent fuel circuits is adjusted while maintaining a substantially constant air flow from the compressor to control a fuel to compressor discharge pressure ratio such that a combustor state does not lag changes in airflow when the combustor responds to the grid frequency deviation.

In a further aspect, a system for generating power is provided. The system includes an electrical grid operating at a standardized grid frequency value and a gas turbine. The gas turbine includes a compressor, a plurality of independent fuel circuits, and a combustor coupled in flow communication with the plurality of independent fuel circuits and the compressor. The gas turbine also includes a sensor to determine a deviation of a grid frequency from the standardized grid frequency value and a controller to adjust fuel flow in response to the grid frequency deviation, wherein fuel flow to a portion of the plurality of independent fuel circuits is adjusted while maintaining a substantially constant air flow from the compressor to control a fuel to compressor discharge pressure ratio such that a combustor state does not lag changes in airflow when the combustor responds to the grid frequency deviation.

DETAILED DESCRIPTION OF THE INVENTION

Figure 1:
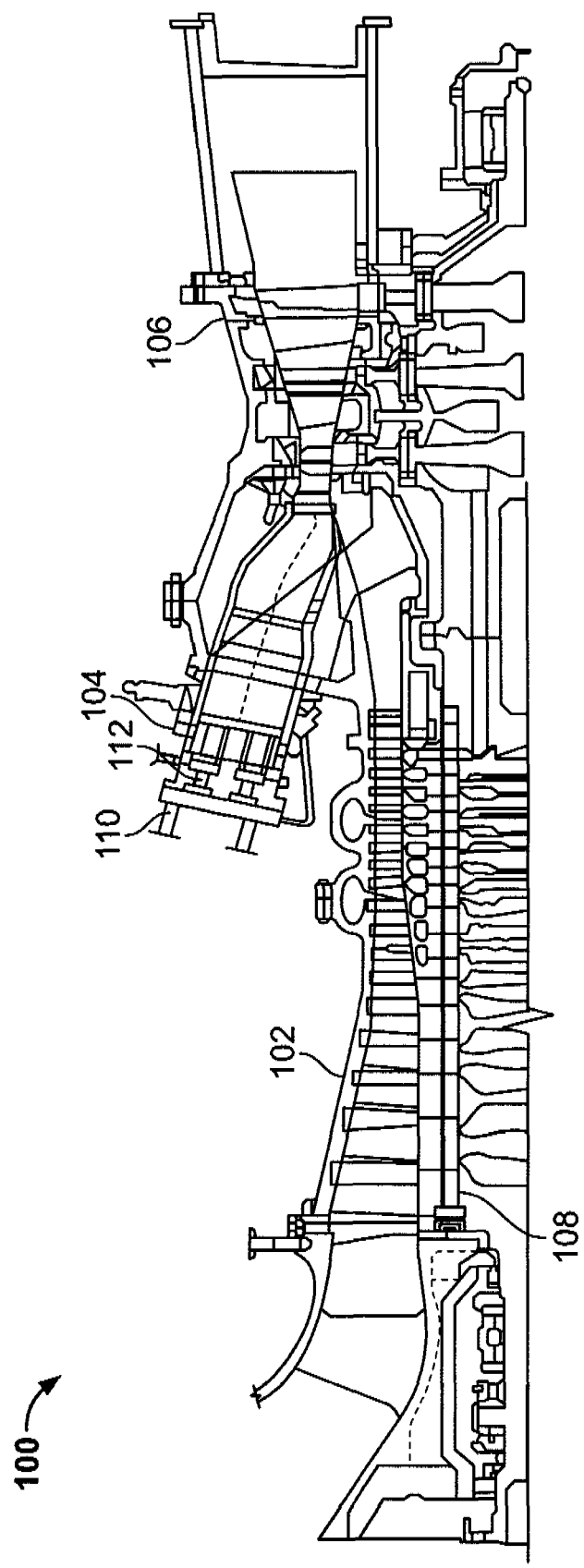
FIG. 1 is a cross-sectional illustration of an exemplary gas turbine engine.

FIG. 1 is a cross-sectional view of an exemplary gas turbine engine 100. Engine 100 includes a compressor assembly 102, a combustor assembly 104, a turbine assembly 106 and a common compressor/turbine rotor shaft 108. Combustor assembly 104 includes a plurality of fuel circuits 110 coupled in flow communication with a plurality of fuel nozzles 112. Each fuel circuit 110 may be individually coupled to a respective fuel nozzle 112, or alternatively, each fuel circuit 110 may be coupled to multiple nozzles 112. Moreover, each fuel circuit 110 may be operated independently from other fuel circuits 110. It should be noted that engine 100 is exemplary only, and that the present invention is not limited to engine 100 and, as such, the present invention may be implemented within any gas turbine engine that functions as described herein.

In operation, air flows through compressor assembly 102 and compressed air is discharged to combustor assembly 104. Combustor assembly 104 injects fuel, for example, but not limited to, natural gas, fuel oil, syngas, biogas, and/or any other fuel capable of operating engine 100 as described herein, through fuel circuits 110 and fuel nozzles 112 into the air flow. Combustor assembly 104 then ignites the fuel-air mixture to expand the fuel-air mixture through combustion and generates a high temperature combustion gas stream. Combustor assembly 104 is in flow communication with turbine assembly 106, and discharges the high temperature expanded gas stream into turbine assembly 106. The high temperature expanded gas stream imparts rotational energy to turbine assembly 106 and because turbine assembly 106 is rotatably coupled to rotor 108, rotor 108 subsequently provides rotational power to compressor assembly 102.

Figure 2:
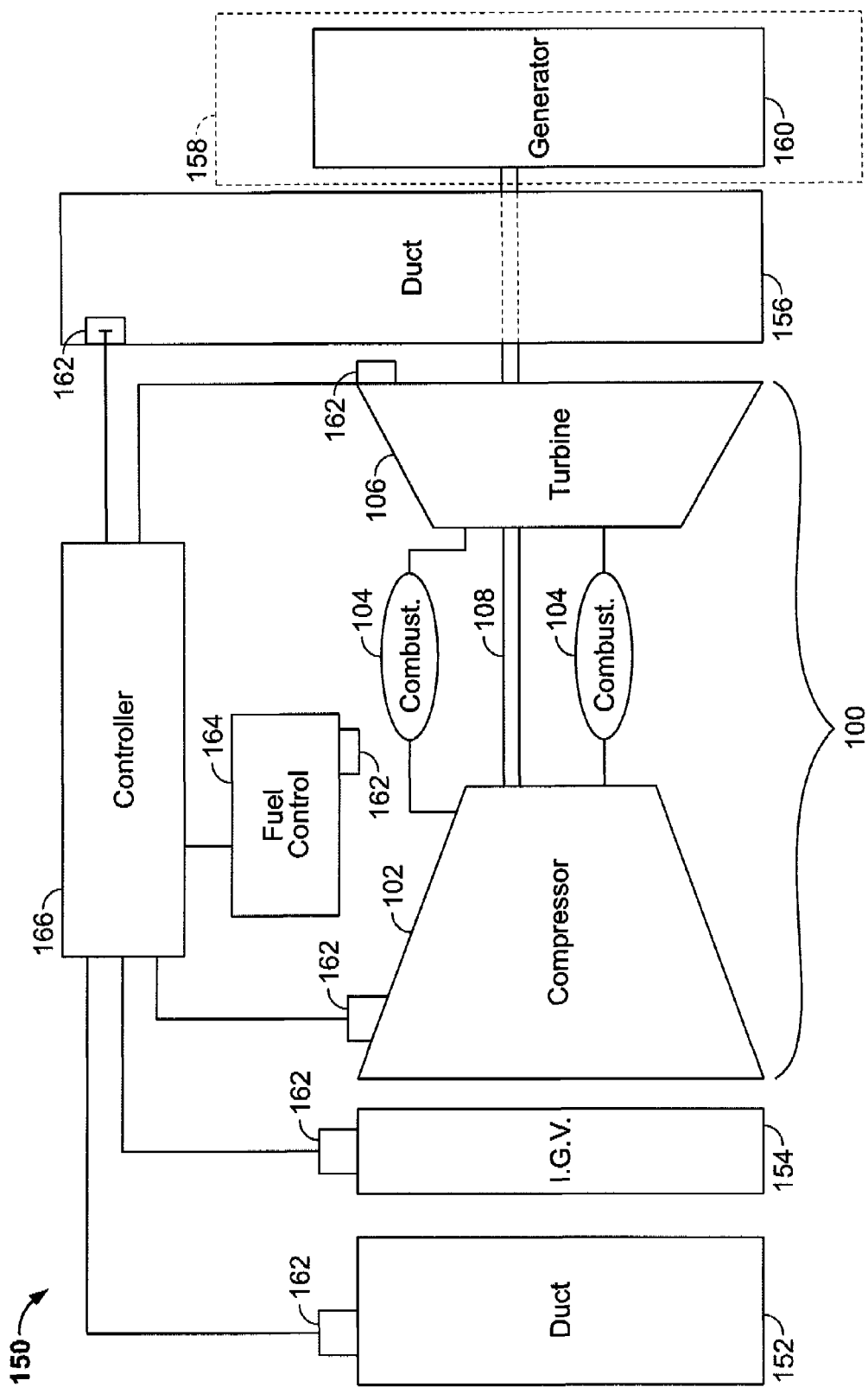
FIG. 2 is a schematic illustration of a power system including the gas turbine engine shown in FIG. 1.

FIG. 2 is a schematic illustration of a power system 150 including gas turbine engine 100, although only a portion of engine 100 is illustrated. Specifically, for simplicity only, compressor 102, combustor assembly 104, turbine 106, and rotor 108 of engine 100 are illustrated. An inlet duct 152 channels air flow to an inlet guide vane 154 that is coupled upstream from and in flow communication with engine 100. An exhaust duct 156 is coupled downstream from, and in flow communication with, engine 100 and channels exhaust gases away from turbine 106. Power system 150 is coupled to a power grid 158 and, more specifically, a generator 160 within power grid 158 is coupled to rotor 108. A plurality of sensors 162 are positioned throughout power system 150 to facilitate control of system 150, as described in more detail below. Specifically, in the exemplary embodiment, sensors 162 are coupled at least within duct 152, inlet guide vane 154, compressor 102, turbine 106, duct 156, and within a fuel control 164. Sensors 162 transmit signals indicative of respective measurements to a controller 166 that is electronically coupled to each sensor 162 and to fuel control 164.

During operation, duct 152 channels air into compressor 102 through inlet guide vane 154. Selective positioning of inlet guide vane 154 facilitates controlling the amount of air channeled into compressor 102. Compressor 102 increases the operating pressure of air entering therein, and channels the pressurized air downstream into combustor assembly 104. The air is mixed with fuel injected through fuel nozzles 112 to create a combustible air/fuel mixture. The air/fuel mixture combusts within combustor assembly 104 and the resulting combustion gases are channeled towards turbine 106. Rotation of turbine 106 drives rotor 108 and causes generator 160 to generate power transmitted to power grid 158. Throughout the operation of power system 150, sensors 162 monitor various attributes of power system 150. Specifically, sensors 162 facilitate maintaining a combustion rate within the combustor by monitoring compressor pressure ratio (CPR), gas turbine exhaust temperature (TTXM), gas manifold fuel pressure, compressor discharge pressure, and compressor discharge temperature.

Power grid 158 creates a demand on turbine 100 in response to a deviation from a standardized grid frequency. Specifically, an increase in power consumption by power grid 158, known as an under-frequency deviation, creates a higher demand for turbine power output. Conversely, a decrease in power consumption by power grid 158, known as an over-frequency deviation, creates a lower demand for turbine power output. Turbine 100 responds to power demands by either increasing or decreasing fuel flow to combustor assembly 104. Specifically, an increased power demand causes an increased fuel flow to combustor assembly 104 and a decreased power demand causes a decreased fuel flow to combustor assembly 104. Sensors 162 monitor power system 150 to facilitate reducing an over-response to the power grid demand. Further, sensors 162 provide information to controller 166 to enable controller 166 to independently operate fuel circuits 110 to facilitate preventing combustor "lag", wherein rapid changes in fuel flow and air flow may result in one of high turbine dynamics or lean blowout.

Figure 3:
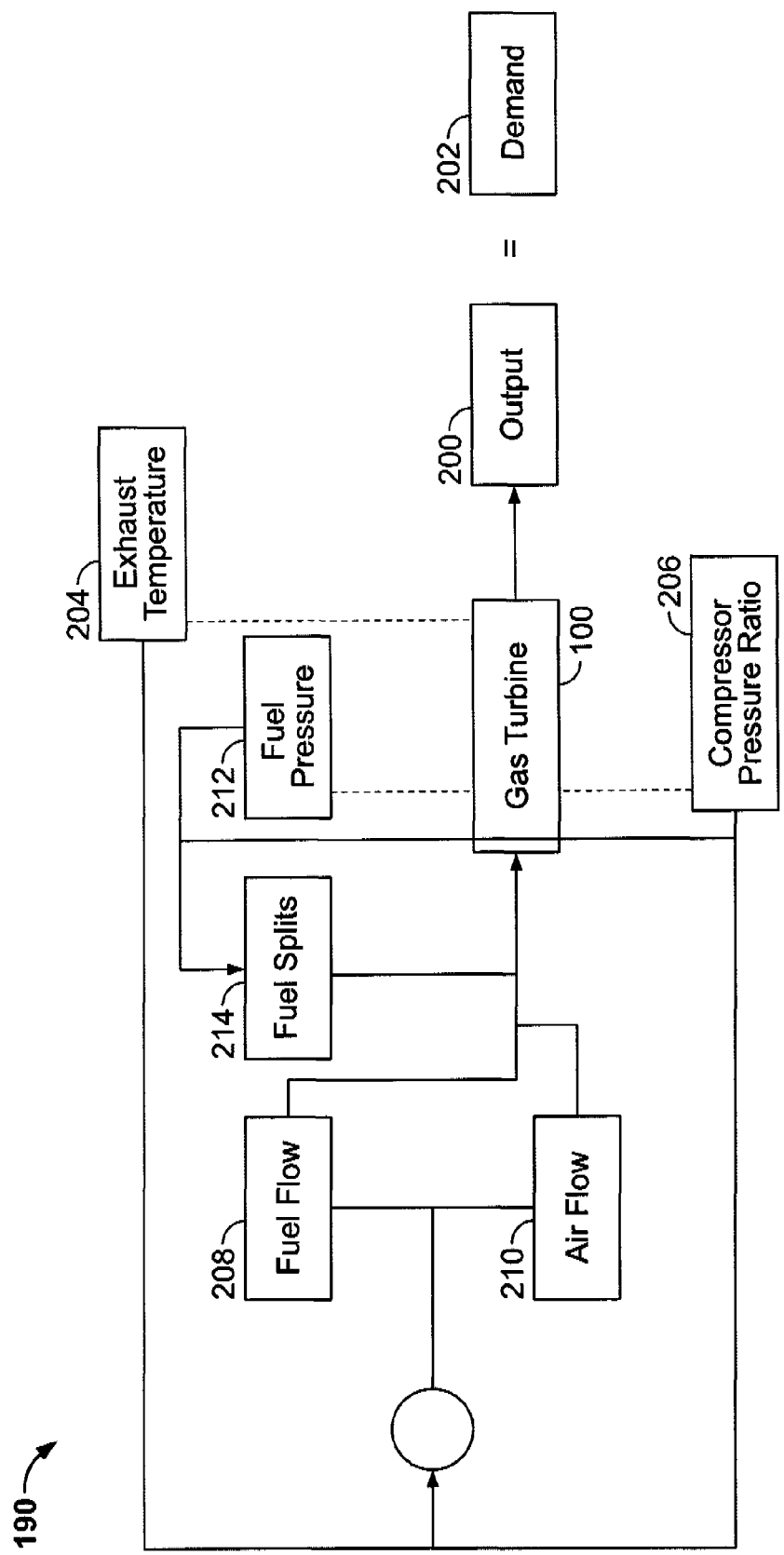
FIG. 3 is a schematic of an exemplary algorithm that may be used to operate the turbine shown in FIG. 1.

FIG. 3 is a schematic of an exemplary algorithm, illustrated by process flowchart 190, used by controller 166 to operate turbine 100. Controller 166 controls operation of turbine 100 to provide an output 200 in response to a demand 202 from power grid 158. Specifically, controller 166 is preprogrammed with data indicative of a desired gas turbine exhaust temperature (TTXM) for a particular range of compressor pressure ratios (CPR) achievable during turbine operation. To facilitate controlling the response to demand 202, controller 166 utilizes information received from sensors 162. Specifically, controller 166 receives information indicative of a current TTXM at 204 and CPR 206. Controller 166 opens or closes inlet guide vanes 154 to facilitate adjusting air flow from compressor 102, such that TTXM at 204 is lowered or raised to a level desired for the measured CPR 206, as indicated by the preprogrammed data. For a given TTXM 204, fuel flow is adjusted to each of the nozzle groups.

When air flow is adjusted prior to the fuel flow, a potential for lean blowout and/or dynamic pressure oscillations is increased. This potential is further complicated by combustor lag due to TTXM 204 and CPR 206 only being measurable after the air and fuel pass through turbine 100. To facilitate preventing combustor lag and, more particularly, lean blowout or dynamic pressure oscillations, controller 166 also utilizes sensors 162 to measure a fuel pressure 212 of the fuel being injected into combustor assembly 104 and compressor discharge pressure, which is a function of CPR 206. These measurements are used to facilitate controlling the state of combustor assembly 104 by controlling a fuel split 214 to nozzles 112. Specifically, controller 166 is preprogrammed with a set of rules that govern operation of the fuel splits. Specifically, the rules define a desired compressor discharge pressure for a range of fuel pressures achievable during operation of turbine 100. Moreover, the rules govern changes in fuel flow to fuel splits 214, such that compressor discharge pressure is adjusted to accommodate the fuel pressure as indicated by the rules. Specifically, fuel splits 214 are independently adjusted such that fuel flow is increased while minimally effecting the stability of the flame within combustor 104. For example, in a turbine 100 having plurality of fuel circuits 110, controller 166 adjusts only a portion of the plurality of fuel circuits 110. In another example, in a turbine 100 having a plurality of fuel circuit groups, controller 166 adjusts only a portion of the groups. In yet another example, in turbine 100 having a plurality of fuel circuits 110 arranged around a center fuel circuit, controller 166 adjust only one of the plurality of fuel circuits 110 or the center fuel circuit. In other alternative embodiments, any combination of fuel circuits 110 and/or center fuel circuits can be operated independently.

Independent adjustment of fuel circuits 110 has a substantially minimal effect on the local anchoring fuel to air ratio in the combustor such that lean blowout and/or dynamic pressure oscillations can be avoided. As such, the present invention provides "front end" control of fuel flow to facilitate adjusting fuel flow while maintaining an air flow from the compressor substantially constant. When the fuel and air pass through turbine 100, the TTXM to CPR ratio can be used to provide "back end" control of the air flow to accommodate acceleration of rotor 108 in response to a grid frequency deviation. Resultantly, the fuel to compressor discharge pressure ratio is controlled such that the combustor state does not lag changes in airflow when the combustor responds to a grid frequency fluctuation. As such, turbine efficiency and durability is improved while reducing the likelihood of a brownout and/or blackout.

In one embodiment, a method of operating a gas turbine is provided, wherein the gas turbine engine is coupled to an electrical grid operating at a standardized grid frequency value, and the gas turbine includes a combustor coupled in flow communication with a plurality of independent fuel circuits and a compressor. The method includes determining a deviation of a grid frequency from the standardized grid frequency value and adjusting fuel flow from a portion of the plurality of fuel circuits while maintaining a substantially constant air flow from the compressor to facilitate controlling a fuel to compressor discharge pressure ratio such that a combustor state does not lag changes in airflow when the combustor responds to the grid frequency deviation.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the apparatus and methods described herein are described in the context of controlling a gas turbine engine for a power system, it is understood that the apparatus and methods are not limited to gas turbine engines or power systems. Likewise, the gas turbine engine and power system components illustrated are not limited to the specific embodiments described herein, but rather, components of both the gas turbine engine and the power system can be utilized independently and separately from other components described herein.

While the invention has been described in terms of various specific embodiments, those skilled in the art will recognize that the invention can be practiced with modification within the spirit and scope of the claims.

What is claimed is:

1. A method of operating a gas turbine coupled to a remote electrical grid operating at a standardized grid frequency value, wherein the gas turbine includes a combustor coupled in flow communication with a plurality of independent fuel circuits and a compressor, said method comprising:

determining a deviation of a grid frequency from the standardized grid frequency value, wherein the grid frequency is at least partially determined based on power consumption by the remote electrical grid; and adjusting fuel flow from a portion of the plurality of fuel circuits based on the determined grid frequency while maintaining a substantially constant air flow from the compressor to adjust a fuel to air ratio of a mixture supplied to the combustor and to facilitate controlling a fuel to compressor discharge pressure ratio such that a combustor state does not lag changes in airflow when the combustor responds to the grid frequency deviation.

2. A method in accordance with claim 1 further comprising measuring at least one operating parameter of the gas turbine to facilitate maintaining a combustion rate within the combustor, wherein the operating parameter measured is at least one of a gas manifold fuel pressure, a compressor discharge pressure, a compressor discharge temperature, and combinations thereof.

3. A method in accordance with claim 1 further comprising:

providing a controller configured to adjust fuel flow.

4. A method in accordance with claim 1 wherein adjusting fuel flow facilitates preventing at least one of lean blowout and dynamic pressure oscillations.

5. A method in accordance with claim 1 further comprising at least one of increasing fuel flow from the plurality of fuel circuits in response to an under-frequency grid frequency deviation within the remote electrical grid and decreasing fuel flow from the plurality of fuel circuits in response to an over-frequency grid frequency deviation within the remote electrical grid.

6. A method in accordance with claim 1 wherein the plurality of fuel circuits includes a center fuel circuit, said adjusting fuel flow further comprising independently adjusting fuel flow from the center fuel circuit.

7. A method in accordance with claim 1 wherein the plurality of fuel circuits are arranged in at least two fuel circuit groups, said adjusting fuel flow further comprising adjusting fuel flow from a first fuel circuit group independent of a second fuel circuit group.

8. A gas turbine coupled to a remote electrical grid operating at a standardized grid frequency value, said gas turbine comprising:

a compressor;

a plurality of independent fuel circuits;

a combustor coupled in flow communication with said plurality of independent fuel circuits and said compressor;

a sensor configured to determine a deviation of a grid frequency from the standardized grid frequency value, wherein the grid frequency is at least partially determined based on power consumption by the remote electrical grid; and a controller configured to adjust fuel flow in response to the grid frequency deviation, wherein fuel flow to a portion of said plurality of independent fuel circuits is adjusted while maintaining a substantially constant air flow from said compressor to adjust a fuel to air ratio of a mixture supplied to the combustor and to control a fuel to compressor discharge pressure ratio such that a combustor state does not lag changes in airflow when said combustor responds to the grid frequency deviation.

9. A gas turbine in accordance with claim 8 wherein said combustor has a combustion rate that is maintained by measuring at least one operating parameter of said gas turbine, wherein the operating parameter includes at least one of a gas manifold fuel pressure, a compressor discharge pressure, a compressor discharge temperature, and combinations thereof.

10. A gas turbine in accordance with claim 8 wherein said controller is preprogrammed with a set of rules for adjusting fuel flow.

11. A gas turbine in accordance with claim 8 wherein the range of combustor response is limited to prevent at least one of lean blowout and dynamic pressure oscillations.

12. A gas turbine in accordance with claim 8 wherein fuel flow from said plurality of fuel circuits is increased in response to an under-frequency grid frequency deviation within the remote electrical grid, and fuel flow from said plurality of fuel circuits is decreased in response to an over-frequency grid frequency deviation within the remote electrical grid.

13. A gas turbine in accordance with claim 8 wherein said plurality of fuel circuits comprises a center fuel circuit, and fuel flow from said center fuel circuit is independently adjustable.

14. A gas turbine in accordance with claim 8 wherein said plurality of fuel circuits comprises at least two fuel circuit groups, and fuel flow from each of said at least two fuel circuit groups is independently adjustable.

15. A system for generating power, said system comprising:
a remote electrical grid operating at a standardized grid frequency value; and
a gas turbine comprising:
a compressor;
a plurality of independent fuel circuits;
a combustor coupled in flow communication with said plurality of independent fuel circuits and said compressor;
a sensor configured to determine a deviation of a grid frequency from the standardized grid frequency value, wherein the grid frequency is at least partially determined based on power consumption by said remote electrical grid; and
a controller configured to adjust fuel flow in response to the grid frequency deviation, wherein fuel flow to a portion of said plurality of independent fuel circuits is adjusted while maintaining a substantially constant air flow from said compressor to adjust a fuel to air ratio of a mixture supplied to the combustor and to control a fuel to compressor discharge pressure ratio such that a combustor state does not lag changes in airflow when said combustor responds to the grid frequency deviation.

16. A system in accordance with claim 15 wherein said combustor has a combustion rate that is maintained by measuring at least one operating parameter of said gas turbine, wherein the operating parameter includes at least one of a gas manifold fuel pressure, a compressor discharge pressure, a compressor discharge temperature, and combinations thereof.

17. A system in accordance with claim 15 wherein said controller is preprogrammed with a set of rules for adjusting fuel flow.

18. A system in accordance with claim 15 wherein the range of combustor response is limited to prevent at least one of lean blowout and dynamic pressure oscillations.

19. A system in accordance with claim 15 wherein fuel flow from said plurality of fuel circuits is increased in response to an under-frequency grid frequency deviation within said remote electrical grid, and fuel flow from said plurality of fuel circuits is decreased in response to an over-frequency grid frequency deviation within said remote electrical grid.

20. A system in accordance with claim 15 wherein said plurality of fuel circuits comprises at least two fuel circuit groups, and fuel flow from each of said at least two fuel circuit groups is independently adjustable.

* * * * *